United States Patent
Goodman et al.

(10) Patent No.: US 8,140,903 B2
(45) Date of Patent: Mar. 20, 2012

(54) HARDWARE PROCESS TRACE FACILITY

(75) Inventors: Benjiman L. Goodman, Austin, TX (US); Sertac Cakici, Austin, TX (US); Samuel I. Ward, Round Rock, TX (US); Linton B. Ward, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 12/425,075

(22) Filed: Apr. 16, 2009

(65) Prior Publication Data

US 2010/0268995 A1    Oct. 21, 2010

(51) Int. Cl.
*G06F 11/00* (2006.01)

(52) U.S. Cl. ............... 714/30; 714/45; 714/37

(58) Field of Classification Search .......... 714/30, 714/32, 37, 45
See application file for complete search history.

(56) References Cited

U.S. PATENT DOCUMENTS

| | | | | |
|---|---|---|---|---|
| 5,751,942 A * | 5/1998 | Christensen et al. | ........... | 714/38 |
| 5,933,626 A * | 8/1999 | Mahalingaiah et al. | ...... | 712/227 |
| 5,940,618 A | 8/1999 | Blandy et al. | | |
| 6,021,261 A | 2/2000 | Barrett, Jr. et al. | | |
| 6,314,530 B1 * | 11/2001 | Mann | .............. | 714/38 |
| 6,427,232 B1 | 7/2002 | Ku et al. | | |
| 6,487,683 B1 * | 11/2002 | Edwards | ........... | 714/38 |
| 6,530,076 B1 * | 3/2003 | Ryan et al. | ........... | 717/128 |
| 6,539,500 B1 | 3/2003 | Kahle et al. | | |
| 6,802,054 B2 | 10/2004 | Faraj | | |
| 6,834,365 B2 | 12/2004 | Bardsley et al. | | |
| 6,966,052 B1 | 11/2005 | Grindeland et al. | | |
| 7,013,456 B1 * | 3/2006 | Van Dyke et al. | ............ | 717/130 |
| 7,051,131 B1 | 5/2006 | Wiedenman et al. | | |
| 7,143,205 B2 * | 11/2006 | Sakugawa | ........... | 710/22 |
| 7,447,946 B2 * | 11/2008 | McHale et al. | ............. | 714/45 |
| 7,788,543 B2 * | 8/2010 | Chen | ............. | 714/45 |
| 2004/0093538 A1 * | 5/2004 | Hester et al. | ........... | 714/45 |
| 2004/0199823 A1 * | 10/2004 | Dodson et al. | ............. | 714/30 |
| 2005/0060516 A1 * | 3/2005 | Bottemiller et al. | ........... | 712/34 |
| 2006/0184833 A1 * | 8/2006 | Al-Omari et al. | ............. | 714/45 |
| 2006/0184834 A1 | 8/2006 | Al-Omari et al. | | |

(Continued)

OTHER PUBLICATIONS

Bustamante, C, "Monitoring I/O bus functions", TDB n7 12-90 p. 465-467, 1990.

*Primary Examiner* — Marc Duncan

(74) *Attorney, Agent, or Firm* — Patrick E. Caldwell, Esq.; The Caldwell Firm, LLC

(57) ABSTRACT

A method for tracing thread bus transactions in a multiprocessor system comprises decoding, by a processor, a first thread instruction of a thread, the thread comprising an ordered series of thread instructions. In the event the first thread instruction is a set bus trace enable bit (BTEB) instruction, the processor sets a bus trace enable bit corresponding to the thread. In the event the BTEB is set, the processor determines whether the first thread instruction is a trace-eligible instruction and, in the event the first thread instruction is a trace-eligible instruction, and the BTEB is set, the processor sets a snoop tag trace enable bit (STTEB). A hardware trace monitor (HTM) monitors bus transactions, each bus transaction comprising a STTE. In the event a monitored bus transaction comprises a set STTEB, the HTM stores the bus transaction as trace data. In the event a monitored bus transaction comprises a reset STTEB, the HTM does not store the bus transaction as trace data.

17 Claims, 4 Drawing Sheets

U.S. PATENT DOCUMENTS

| | | |
|---|---|---|
| 2006/0184835 A1* | 8/2006 | Al-Omari et al. ............... 714/45 |
| 2006/0184836 A1* | 8/2006 | Al-Omari et al. ............... 714/45 |
| 2006/0184837 A1* | 8/2006 | Al-Omari ...................... 714/45 |
| 2006/0206763 A1* | 9/2006 | Kudo .............................. 714/30 |
| 2008/0256396 A1* | 10/2008 | Giannini et al. ................ 714/45 |
| 2010/0023811 A1* | 1/2010 | Moyer ........................... 714/47 |

* cited by examiner

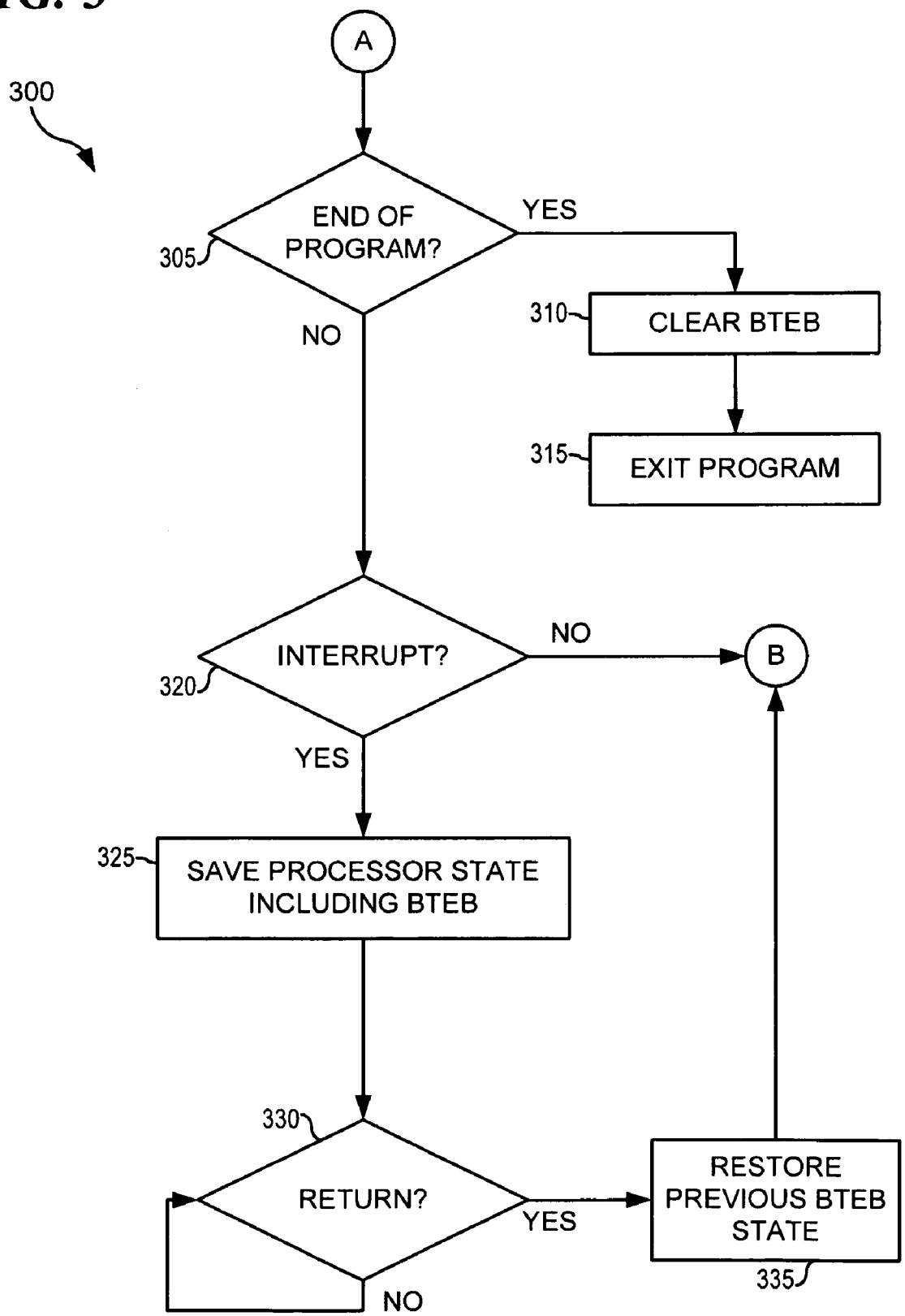

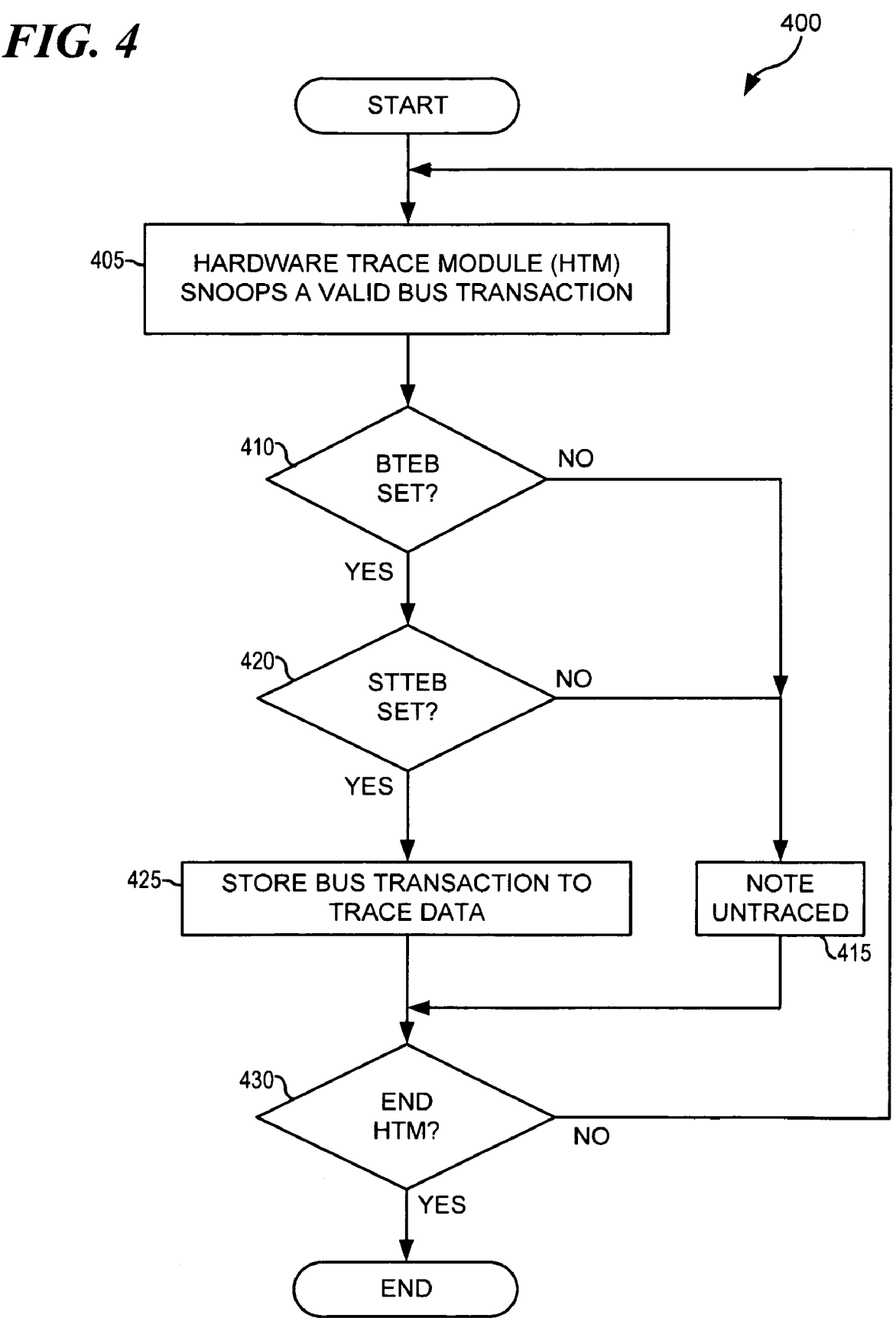

HARDWARE PROCESS TRACE FACILITY

TECHNICAL FIELD

The present invention relates generally to the field of computer system development and parallel processing and, more particularly, to a hardware process trace facility.

BACKGROUND OF THE INVENTION

Modern processing systems are complex and difficult to design. One of the more challenging aspects of system design relies on an analysis of the performance of the systems, both for speed and reliability. One important performance analysis tool is a hardware-collected trace. Typically, traces provide data used to simulate system performance, to make hardware design tradeoffs, to tune software, and to characterize workloads. Hardware traces are virtually independent of operating system, application, and workload. This attribute makes these traces especially well suited for characterizing the On-Demand and Virtual-Server-Hosting environments now supported on recent servers.

For example, a symmetric multiprocessing (SMP) data processing server has multiple processors with multiple symmetric cores, such that each processor has more or less the same processing speed and latency. An SMP system could have multiple operating systems running on different processors (a "logically partitioned" system), or multiple operating systems running on the same processors one at a time (a "virtual server" hosting environment). Generally, operating systems divide processing work into tasks that can be distributed among the various cores by dispatching one or more software threads of work to each processor. Multiple operating system environments complicates hardware trace operations and performance analysis.

Among SMP systems, thread handling further complicates performance analysis. For example, a single-thread SMP system includes multiple cores that can execute only one thread at a time. A simultaneous multi-threading (SMT) SMP system includes multiple cores that can each concurrently execute more than one thread at a time per processor. SMT systems can also favor one thread over another when both threads are running on the same processor. As such, many designers use a hardware trace facility to capture various hardware signatures within a processor as trace data for analysis. This trace data may be collected from events occurring on processor cores, busses, caches, or other processing units included within the processor. Most typical hardware trace facilities collect hardware traces from a trace source within the processor and then store the traces in a predefined memory location.

In the case of a multi-processor server, however, there are often many processes running across the multiple processing cores, complicating performance analysis generally and hardware trace operations specifically. Particularly in multi-core, virtualized computer systems, many processor threads can generate cache misses simultaneously, therefore also generating a relatively high volume of system bus traffic to unrelated real addresses in the main memory. Current hardware trace systems cannot adequately trace these multiple bus transactions or capture the relevant trace data in a form useful to the design and test engineers.

Therefore, there is a need for a system and/or method for hardware process tracing that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

A method for tracing thread bus transactions in a multiprocessor system comprises decoding, by a processor, a first thread instruction of a thread, the thread comprising an ordered series of thread instructions. In the event the first thread instruction is a set bus trace enable bit (BTEB) instruction, the processor sets a bus trace enable bit corresponding to the thread. In the event the BTEB is set, the processor determines whether the first thread instruction is a trace-eligible instruction and, in the event the first thread instruction is a trace-eligible instruction, and the BTEB is set, the processor sets a snoop tag trace enable bit (STTEB). A hardware trace monitor (HTM) monitors bus transactions, each bus transaction comprising a STTE. In the event a monitored bus transaction comprises a set STTEB, the HTM stores the bus transaction as trace data. In the event a monitored bus transaction comprises a reset STTEB, the HTM does not store the bus transaction as trace data.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 3 illustrates a high-level flow diagram depicting logical operational steps of an improved hardware process trace method, which can be implemented in accordance with a preferred embodiment; and FIG. 4 illustrates a high-level flow diagram depicting logical operational steps of an improved hardware process trace method, which can be implemented in accordance with a preferred embodiment.

DETAILED DESCRIPTION

Figure 1:
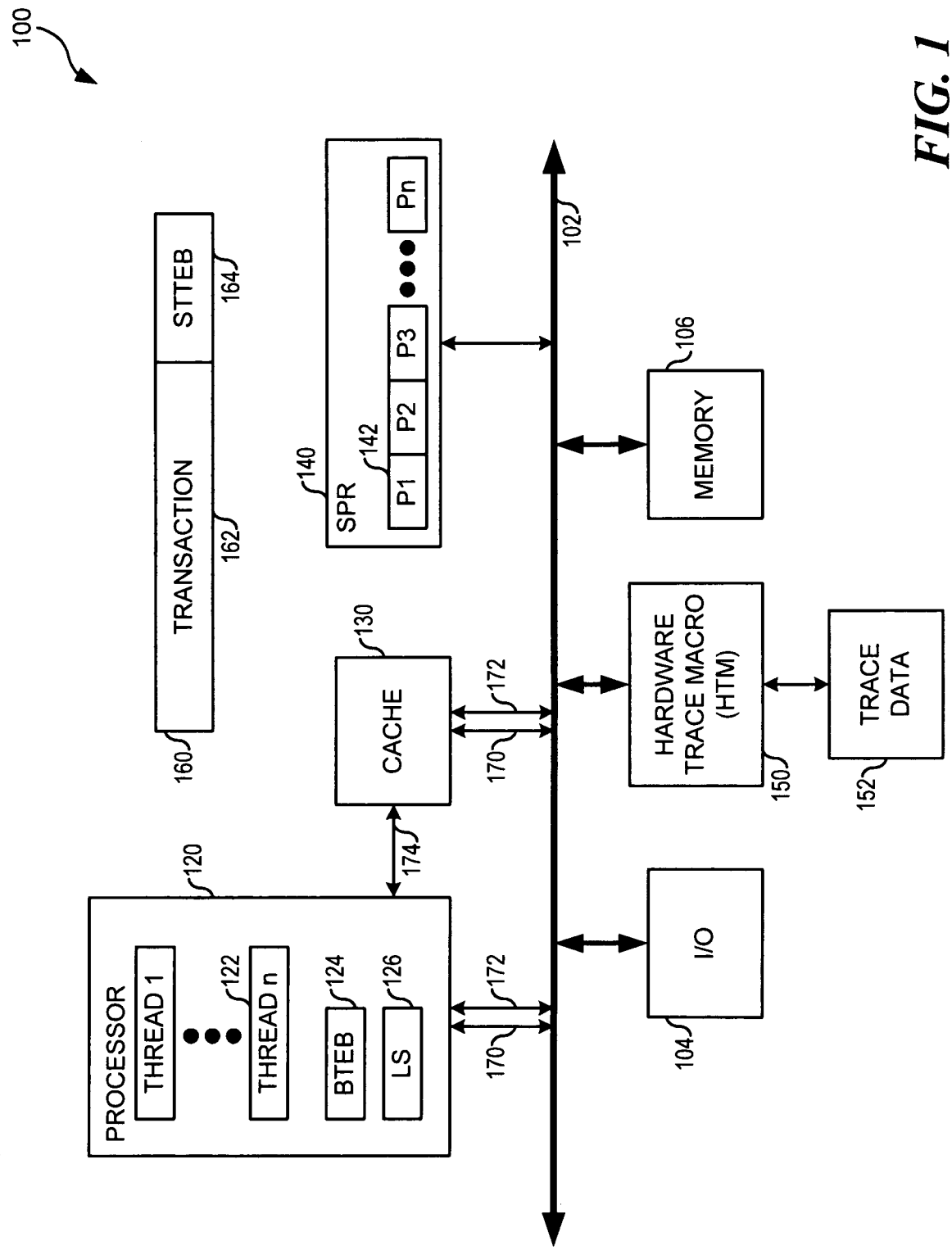
FIG. 1 illustrates a block diagram showing a hardware process trace system in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain components of a system 100 for improved hardware process tracing, in accordance with a preferred embodiment of the present invention. System 100 comprises a system bus 102.

System bus 102 is an otherwise conventional system bus, modified as described below. Generally, the various components of system 100 couple to system bus 102 and communicate with each other, and with components outside of system 100, through system bus 102. For example, system 100 includes an otherwise conventional input/output (I/O) module 104 and an otherwise conventional main memory 106, both of which couple to system bus 102.

System 100 also includes a processor 120 and a cache 130. Processor 120 couples to system bus 102 and is an otherwise conventional processor, modified as described herein. In the illustrated embodiment, processor 120 operates as a multi-threaded processor, and includes a plurality of threads 122. Generally, each thread 122 is associated with a unique process. A single process may have multiple threads associated with the process and processor 120 can be configured to support multiple processes.

In the illustrated embodiment, processor 120 also includes a bus trace enable bit (BTEB) register 124 and a local store (LS) 126. Generally, LS 126 is an otherwise conventional processor local store. BTEB register 124 is an otherwise conventional register configured to store a BTEB, as described in more detail below. In one embodiment, BTEB register 124 stores a single bit that indicates whether tracing is enabled for the processor 120 as a whole. In an alternate embodiment, BTEB register 124 stores an array of bits, each bit associated with a thread, and each bit indicating whether tracing is enable for that thread.

In the illustrated embodiment, processor 120 also couples to cache 130. Cache 130 couples to processor 120 and system bus 102 and is an otherwise conventional cache, modified as described herein. Generally, in the illustrated embodiment, cache 130 operates as a level 2 (L2) cache. In alternate embodiments, cache 130 can be configured as a local store, level 1 cache, or a level 3 or higher cache.

For ease of illustration and description, FIG. 1 shows system 100 configured with a single processor 120. In alternate embodiments, system 100 can include a plurality of processing nodes and processors, including processors with multiple cores. Similarly, FIG. 1 shows system 100 configured with a single cache 130. In alternate embodiments, system 100 can include multiple caches at varying levels, coupled to one or more processors. As described in more detail below, one of the advantages of the embodiments described herein is the ability to trace process thread bus transactions in complex systems.

As such, in one embodiment, system 100 includes a special purpose register (SPR) 140. SPR 140 couples to system bus 102 and is an otherwise conventional register, modified as described herein, and can be implemented as a register file. In the illustrated embodiment, SPR 140 includes an array 142 of state bits, each bit corresponding uniquely to a processor. In one embodiment, each bit is a BTEB. In an alternate embodiment, described in more detail below, each bit is a snoop tag trace enable bit (STTEB). Generally, as described in more detail below, the bits in array 142 indicate whether the processor associated with a bit has enabled trace capture of certain bus transactions.

More particularly, system 100 includes hardware trace macro (HTM) 150. Hardware trace macro (HTM) 150 couples to system bus 102 and is an otherwise conventional hardware trace macro, modified as described herein. Generally, HTM 150 monitors bus transactions on system bus 102. In certain cases, described in more detail below, HTM 150 stores monitored bus transactions as trace data 152.

In one embodiment, each bus transaction on system bus 102 is configured as illustrative bus transaction 160. Bus transaction 160 includes a transaction 162 and an STTEB 164. Generally, transaction 162 is an otherwise conventional bus transaction. In one embodiment STTEB 164, described in more detail below, indicates whether bus transaction 160 is a trace-eligible instruction.

Together, the components of system 100 operate to trace certain bus transactions, based on the state of a bus trace enable bit (BTEB) signal and a snoop tag trace enable bit (STTEB) signal. Generally, the embodiments disclosed herein embody a hardware trace facility that captures a hardware bus trace of various interesting events within system 100, particularly system bus transactions generated by cache 130 requesting data from either memory 106 or another cache (not shown) of system 100, on behalf of processor 120 executing a unique process thread 122. System 100 illustrates a variety of ways in which the components can be configured to embody these signals and to trace the desired bus transactions. In each case, the embodiments disclosed herein provide advantages over current approaches.

For example, a hardware trace facility currently in use can be configured to filter system bus transactions, thereby tracing only those bus events originating from a particular chip or core within the system. Some current designs can also synchronously trigger multiple hardware trace facilities coupled to the system bus, which can start and stop groups of hardware trace facilities. But current trace facilities cannot trace bus operations related to the execution of a unique process, independent of the core or processor on which that process is executing at any particular time.

In the embodiments disclosed herein, however, system 100 can be configured to trace only bus events that have a particular bus tag bit set to true and ignore the rest, with the tag bits configured at the thread level. Generally, HTM 150 checks a tag bit, and if the tag bit is set to true, HTM 150 records the bus event and stores the bus event as trace data 152. If the tag bit is not set (that is, reset, or set to false), HTM 150 ignores the bus event. In one embodiment HTM 150 also tracks the number of elapsed clock cycles, thereby timing the interval between bus events.

In a first configuration, described in more detail below, system 100 includes a BTEB signal line alongside the system bus 102, and each bus transaction 160 includes a STTEB tag 164. In the first configuration, processor 120 and cache 130 couple to system bus 120 in the usual manner through link 170. Processor 120 and cache 130 also couple to a parallel signal line, link 172, which carries the BTEB signal. When the BTEB signal is high, HTM 150 checks each bus transaction 160 to determine whether that transaction's STTEB 164 is also high. If the transaction's STTEB 164 is also high, HTM 150 records the bus transaction as trace data 152. Otherwise, if either the BTEB signal is low or STTEB is low, HTM 150 ignores the bus transaction.

In a second configuration, also described in more detail below, system 100 includes an STTEB signal line alongside the system bus 102, and each processor 120 indicates a BTEB status through BTEB register 124. In an alternate embodiment, SPR 140 stores the BTEB status of each processor 120 in an array 142. As in the first configuration, processor 120 and cache 130 also couple to a parallel signal line, link 172, which in this configuration carries the STTEB signal. When the BTEB bit is set, HTM 150 checks the state of the STTEB signal on link 172. Whenever a processor's BTEB is set, and the STTEB signal is high, HTM 150 records each of that processor's bus transactions 160 as trace data 152. Otherwise, if either the BTEB bit is reset or low, or the STTEB signal is low, HTM 150 ignores the bus transaction for that processor.

As described above, system 100 can be configured to monitor bus transactions at the thread level. In the first configuration, in one embodiment, each processor sets the STTEB 164 only for bus transactions of those threads under examination by trace. In this way, processor 120 can select particular bus transactions of interest for tracing, including all or some transactions of a particular thread, controlling the start and end times of the tracing interval through the BTEB signal. In the second configuration, in one embodiment, SPR 140 can be configured as a matrix, with each thread represented as a subset of bits corresponding to that processor. As such, processor 120 can set the bits corresponding to threads under examination generally, controlling which bus transaction types to record through the STTEB signal. In both cases, system 100 achieves a trace granularity unavailable in current systems.

In the first and second configurations described above, HTM 150 is aware of the state of the BETB signal. In a third exemplary configuration, HTM 150 is not aware of the BTEB signal. Instead, HTM 150 records all bus transactions that have their STTEB tag set, whenever HTM 150 is otherwise enabled. In this third configuration, in one embodiment, processor 120 sets the BTEB, either in BTEB register 124 or an associated bit in SPR 140. When the BTEB bit is set, the hardware thread communicates with the cache controller to set the STTEB bus tag bit for all trace-eligible bus transactions for that thread. That is, either processor 120 or cache 130, whichever is operating as the cache controller (or a separate cache controller (not shown)), sets the STTEB tag for trace-eligible bus transactions originating from hardware threads 122 that have their associated BTEB set. As described above, in one embodiment, HTM 150 records as trace data all bus transactions that have their STTEB set.

As described above, system 100 includes SPR 140 and BTEB register 124. So configured, the system 100 architecture can be configured to include a "set BTEB" instruction and a "clear BTEB" instruction. The set BTEB instruction, generally, sets the BTEB associated with the thread executing the instruction. The clear BTEB instruction, generally, clears or resets the BTEB associated with the thread executing the instruction. In one embodiment, the set BTEB instruction is an "mtspr" instruction. In one embodiment, the clear BTEB instruction is a different instruction from the set BTEB instruction. In an alternate embodiment, the set BTEB instruction toggles the state of the associated BTEB and so functions as both a set BTEB and as a clear BTEB instruction. Thus, programs executing on system 100 can set the BTEB state bit, in one embodiment by executing an mtspr instruction, prior to executing a critical section of code that the program wants HTM 150 to capture, clearing the BTEB after the critical code section. In one embodiment, the set BTEB/clear BTEB instructions are configured as user-level access instructions.

As described above, one or more components of system 100 can be configured to read the BTEB state. In one embodiment, SPR 140 is visible to every component coupled to system bus 120. In an alternate embodiment, processor 120 indicates the BTEB state to cache 130 thorough link 174. In one embodiment, the BTEB passes to each level cache 130 between processor 120 and system bus 120. As described above, in one embodiment, the cache controller sets the STTEB tag bit for trace-eligible bus transactions, whether those trace-eligible bus transactions are cacheable or non-cacheable.

For example, in one embodiment, there are generally five types or categories of bus events or bus transactions. A first category is cache communication with main memory. This category includes load cache misses and prefetches (memory reads), store misses (and other requests for ownership), store hits (in write-through caches), memory writes due to a cache snooping another bus request to modify the data, and memory writes due to cache capacity overflows (in write-back caches).

A second category is processor communication with I/O adapters. This category includes "mmio loads" (writes to I/O from core registers) and "mmio stores" (reads from I/O to core registers. A third category is cache communication with other caches. This category includes cache-to-cache intervention due to a cache snooping a request for data that hits in the local cache. A fourth category is synchronization operations, which, generally, are instructions used to synchronize execution. A fifth category is I/O communication with main memory. This category includes direct memory access (DMA) reads and DMA writes.

In one embodiment, trace-eligible bus transactions are any bus transactions except those in the fifth category, I/O-memory communications. In an alternate embodiment, cache load/store misses, mmio loads/stores and synchronization operations are trace-eligible. For example, in one embodiment, for cache load/store misses, mmio loads/stores and synchronization operations, the bus master is typically directly linked to the hardware thread that executes the instruction. As such, the BTEB state is visible to the processor and/or cache controller executing the bus transaction instruction, which therefore can also set the STTEB bus tag.

In an alternate embodiment, cache writes to memory due to another cache's snoop request are trace-eligible bus transactions. For example, where the snoop response requires ownership of the cache line, the snooping cache can be configured to use the STTEB tag value in the originating cache's bus transaction to set the STTEB tag in the snooping cache's subsequent write to memory. In one embodiment, cache 130 includes a 1-bit compare circuit and a set and hold latch to implement this function.

In an alternate embodiment, cache writes to memory due to capacity reasons in a write-back cache are trace-eligible bus transactions. Generally, in a write-back cache, it can be difficult to determine whether a memory write is due to execution of the thread targeted for tracing. In one embodiment, cache 130 includes a state machine (not shown) configured to perform write-back management operations, in particular to write data evicted for capacity reasons from the cache to memory. As such, in one embodiment, the write-back state machine can be configured to use a shadow copy of the BTEB state bit, and to set the STTEB bus tag bit for all capacity writes to memory if the BTEB in the associated processor (or thread) is set.

For example, in one embodiment, cache 130 includes a least-recently-used (LRU) algorithm to select a victim cache line to evict in order to make room for new data. In some cases, the victim cache line is in the modified state. In one embodiment, cache 130 assumes that the victim cache line contains data modified by the thread under inspection. In one embodiment, the victim cache line contains data from a previous process, instead of the thread under inspection, such as, for example, on return from an interrupt handling procedure. In such embodiments, HTM 150 traces more capacity writes than are actually associated with the thread under inspection. However, generally, the extra traced capacity writes will typically be a very small percentage of the overall run time of the process thread(s).

System 100 can also be configured to operating with context switching and interrupt handling protocols. For example, generally, an operating system (OS) can suspend a process/thread at any time from running on a physical hardware thread, exchanging one process/thread for another. Generally, the OS saves the hardware thread architected state of the currently executing thread when it suspends that thread. When the OS subsequently dispatches the suspended thread back to a hardware thread (that is, a specific core/processor), the OS also loads the saved architected state so that the thread will pick up executing where it left off. Thus, system 100 can re-dispatch a suspended process/thread to any inactive physical hardware thread in a multi-core machine.

As such, any particular process/thread can run on more than one of the resources visible to the OS. Current hardware trace systems cannot track threads of interest across multiple processors and/or cores. In the embodiments disclosed herein, however, system 100 stores the BTEB state along with the other typical state bits used in process/context switching. After storing the BTEB state, system 100 clears the BTEB for the incoming context/process. Similarly, system 100 restores the BTEB state for processes coming out of suspension. Setting the BTEB if the BTEB was set when the process was suspended.

In one embodiment, system 100 handles interrupts in the same way as the context switches, saving and restoring the BTEB state as appropriate. Generally, any interrupts that would cause the process/thread to be interrupted call an interrupt service routine that clears the BTEB when executing the service routine, and then restores the BTEB upon returning the process/thread to execution.

Similarly, system 100 can be configured to store BTEB states across different modes of operation, such as between user, kernel/system, and hypervisor mode, for example. Thus, in embodiments with a hypervisor software layer between the OS and hardware, the hypervisor can be configured to save and restore the BTEB state between interrupting the OS. Further, in systems where the OS can be dispatched again onto a different physical processor, the hypervisor can be configured to store/restore the processor state information, including the BTEB state. In one embodiment, where the OS returns to the same physical hardware thread after a hypervisor interrupt, system 100 can be configured to mask the BTEB bit with the thread state bit, along with the User mode, System mode, and Hypervisor mode state bits.

Figure 2:
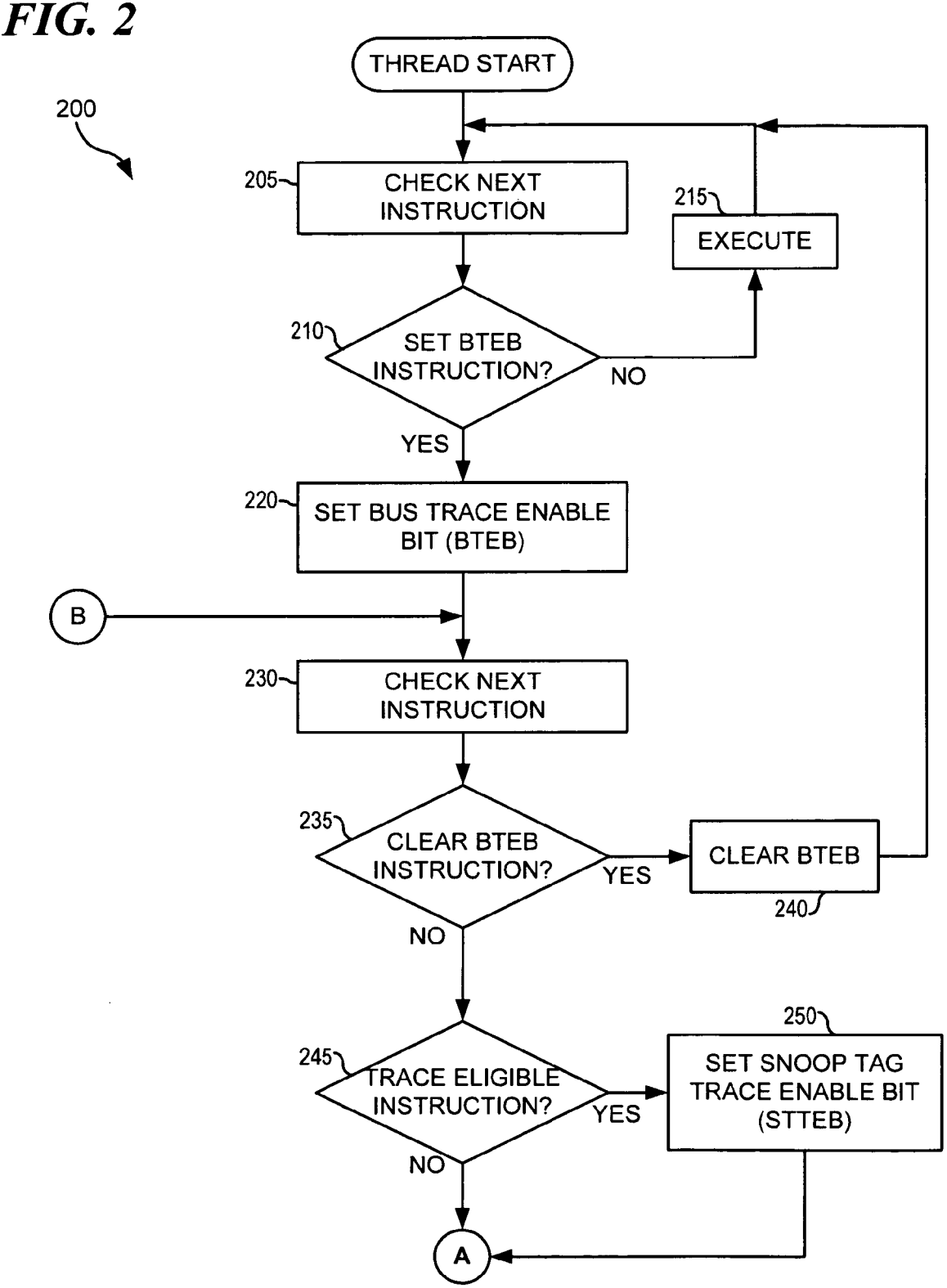
FIG. 2 illustrates a high-level flow diagram depicting logical operational steps of an improved hardware process trace method, which can be implemented in accordance with a preferred embodiment.

The following Figures provide further details of operation of system 100, in accordance with one embodiment. FIG. 2 illustrates one embodiment of a method for hardware tracing. Specifically, FIG. 2 illustrates a high-level flow chart 200 that depicts logical operational steps performed by, for example, system 100 of FIG. 1, which may be implemented in accordance with a preferred embodiment. Generally, a cache controller, processor 120 and/or cache 130 perform the steps of the method, unless indicated otherwise.

The process begins as a thread begins execution on a hardware thread of a processor 120. As indicated at block 205, the processor 120 checks the next instruction of the thread (or the first instruction at the beginning of thread execution or return from suspension). In one embodiment, processor 120 decodes the thread instruction. In an alternate embodiment, processor 120 receives the thread instruction decoded. In one embodiment, a thread of a process comprises a plurality of ordered thread instructions.

Next, as indicated at block 210, processor 120 determines whether the thread instruction is a "set BTEB" instruction. In one embodiment, a set BTEB instruction is an mtspr instruction. If at block 210 the thread instruction is not a set BTEB instruction, the process continues along the NO branch to block 215. As indicated at block 215, the processor executes the thread instruction and returns to block 205, wherein the processor checks the next thread instruction.

If at block 210 the thread instruction is a set BTEB instruction, the process continues along the YES branch to block 220. At block 220, the processor sets the BTEB. In one embodiment, processor 120 sets a BTEB register 124 internal to processor 120. In an alternate embodiment, processor 120 sets a bit corresponding to the thread in SPR 140. In an alternate embodiment, processor 120 raises a BTEB signal, for example, on link 172. In an alternate embodiment, processor 120 indicates to cache 130 that the BTEB is set, for example, by link 174.

Next, as indicated at block 230, the processor checks the next thread instruction. Next, as indicated at decisional block 235, the processor determines whether the thread instruction is a "clear BTEB" instruction. In one embodiment, a clear BTEB instruction is an mtspr instruction. If at block 235 the thread instruction is a clear BTEB instruction, the process continues along the YES branch to block 240. As indicated at block 240, the processor clears the BTEB state and returns to block 205, wherein the processor checks the next thread instruction.

If at block 235 the thread instruction is not a clear BTEB instruction, the process continues along the NO branch to decisional block 245. As indicated at block 245, the processor determines whether the thread instruction is a trace eligible instruction. If at block 245 the thread instruction is a trace eligible instruction, the process continues along the YES branch to block 250. Next, as indicated at block 250, the processor sets the STTEB associated with the instruction. In one embodiment, processor 120 sets the STTEB. In an alternate embodiment, a cache controller or cache 130 sets the STTEB. In one embodiment, processor 120 raises an STTEB signal, such as link 172, for example. In an alternate embodiment, cache 130 raises an STTEB signal, such as link 172 for example.

If at block 245 the thread instruction is not a trace eligible instruction, the process continues along the NO branch to marker "A" of FIG. 3.

FIG. 3 illustrates one embodiment of a method for hardware tracing. Specifically, FIG. 3 illustrates a high-level flow chart 300 that depicts logical operational steps performed by, for example, system 100 of FIG. 1, which may be implemented in accordance with a preferred embodiment. Generally, processor 120 performs the steps of the method, unless indicated otherwise.

The process begins at Marker "A" and continues to decisional block 305. As indicated at decisional block 305, the processor determines whether the thread instruction indicates the end of the program of which the thread is a part. If at block 305 the thread instruction indicates the end of the program, the process continues along the YES branch to block 310. Next, as indicated at block 310, the processor clears the BTEB. Next, as indicated at block 315, the processor exits the program. In one embodiment, processor 120 performs various housekeeping operations to terminate the program, including operations on behalf of the OS.

If at block 305 the thread instruction does not indicate the end of the program, the process continues along the NO branch to decisional block 320. Next, as indicated at decisional block 320, the system determines whether there is an active interrupt. If at block 320 there is not an active interrupt, the process continues along the NO branch to marker "B", returning to block 230 of FIG. 2.

If at block 320 there is an active interrupt, the process continues along the YES branch to block 325. Next, as indicated at block 325, the system saves the processor state, including the BTEB state. In one embodiment, the OS saves the processor state. In an alternate embodiment, a hypervisor saves the processor state. In an alternate embodiment, an interrupt handling routine saves the processor state. In one embodiment, the system also clears the BTEB.

Next, at decisional block 330, the system determines whether to return from interrupt. If not, the process continues along the NO branch, returning to block 330. If at decisional block 330 the system returns from interrupt, the process continues along the YES branch to block 335. Next, as indicated at block 335, the system restores the processor's previous state, including the BTEB state. Next, the process continues to marker "B", returning to block 230 of FIG. 2.

FIG. 4 illustrates one embodiment of a method for hardware tracing. Specifically, FIG. 4 illustrates a high-level flow chart 400 that depicts logical operational steps performed by, for example, system 100 of FIG. 1, which may be implemented in accordance with a preferred embodiment. Generally, HTM 150 performs the steps of the method, unless indicated otherwise.

The process begins as the HTM starts and begins monitoring bus transactions. Next, as indicated at block 405, the HTM snoops a valid bus transaction. Next, as indicated at decisional block 410, the HTM determines whether the BTEB is set for the thread associated with the snooped bus transaction. In one embodiment, HTM 150 checks BTEB signal line 172. In an alternate embodiment, HTM 150 checks a bit corresponding to the thread in SPR 140. In an alternate embodiment, the process skips this block entirely and continues to block 420.

If at decisional block 410 the BTEB is not set for the thread associated with the snooped bus transaction, the process continues along the NO branch to block 415. As indicated at block 415, the HTM notes the bus transaction untraced. In one embodiment, HTM 150 ignores the bus transaction. In an alternate embodiment, HTM 150 counts and stores the clock cycles associated with the bus transaction.

If at decisional block 410 the BTEB is set for the thread associated with the snooped bus transaction, the process continues along the YES branch to decisional block 420. As indicated at block 420, the HTM determines whether the STTEB associated with the bus transaction is set. In one embodiment, HTM 150 checks STTEB signal line 172. In an alternate embodiment, HTM 150 checks an STTEB tag 164 of bus transaction 160.

If at decisional block 420 the STTEB associated with the bus transaction is not set, the process continues along the NO branch to block 415, described above, and then to decisional block 430. If at decisional block 420 the STTEB associated with the bus transaction is set, the process continues along the YES branch to block 425. Next, as indicated at block 425, the HTM stores the bus transaction to trace data. The process continues to decisional block 430.

Next, as indicated at decisional block 430, the system determines whether to terminate the HTM process. If at decisional block 430 the system does not terminate the HTM process, the process continues along the NO branch, returning to block 405. If at decisional block 430 the system terminates the HTM, the process continues along the YES branch and the process ends.

Thus, generally, system 100 operates to store trace data relevant to process threads of interest to system operators. In one embodiment, system 100 traces only those bus transactions relating to the execution of a particular process. Further, in one embodiment, system 100 dynamically configures a hardware trace facility (HTM 150) to trace only those system bus operations originating from the cache associated with the processes/threads executing on a particular core/processor.

In one embodiment, HTM 150 can be configured to trace all bus transactions observed in the system and to store the transactions in memory, which can be used to measure system performance and/or debug problems like cache coherency bugs or software algorithm problems. In one embodiment, HTM 150 can be configured to store a subset of bus transactions associated with a particular thread to a separate trace data set. In an alternate embodiment, HTM 150 stores only those bus transactions associated with the thread of interest.

In one embodiment, a processor executes an instruction to set a new processor state bit, the Bus Trace Enable Bit (BTEB), prior to executing instructions of interest in the thread. When the processor finishes executing the instructions of interest, the processor executes an instruction to clear the BTEB state. In one embodiment, the system interrupt handlers manage the BTEB when any interrupt or context switch occurs while the process is running, much in the same fashion that other processor state bits are saved and restored.

In one embodiment, while the BTEB state bit is set, all bus transactions originating from that hardware thread broadcast on the system bus with a special tag bit, the STTEB. In one embodiment, the system broadcasts this Snoop Tag Trace Enable Bit (STTEB) alongside the snoop requests and responses. In one embodiment, the hardware trace facility (HTM 150) traces all bus operations that have the STTEB tag bit set. As described above, various embodiments set these bits statically or dynamically.

Accordingly, the disclosed embodiments provide numerous advantages over other methods and systems. For example, the embodiments disclosed herein can be particularly useful in understanding how often a program is interrupted by an OS context switch or interrupt, and how that program (or single thread) is re-dispatched to various physical hardware threads. The embodiments disclosed herein also facilitate identifying the effects of running that program in conjunction with other operating systems, partitions, and programs within a highly virtualized SMP computer. In one embodiment, this process is even more focused by ignoring communications between a process and IO.

Additionally, the embodiments disclosed herein can also be employed to study how a process bounces around among different physical hardware threads as a result of the OS reassigning the process. The embodiments disclosed herein can also be employed to study how the process execution is affected by an OS context switch, a hardware interrupt, or a hypervisor interrupt, and the differences between the effects of the various interrupts. Further, the embodiments disclosed herein can also be employed to observe the locality of the cache miss references for a process, without having to translate real to effective addresses. All of these features provide significant advantages over prior systems and methods.

The novel embodiments disclosed herein are especially useful in tracing process threads in multi-processor environments with multiple operating systems enabled. For example, the embodiments disclosed herein can be employed to trace bus traffic for only one particular process, even in systems where there are multiple processes running on multiple operating systems within the same machine. For example, the embodiments disclosed herein can be employed on a machine that is setup to run multiple commercial workloads on multiple partitions. In cases where the operator believes there is a bug in the OS Kernel, the embodiments disclosed herein can be employed to trace the bus transactions relating to the OS accessing memory, as well as identifying what physical thread the process was running on, and when it started and stopped execution. As such, the embodiments disclosed herein can be employed to solve complex design and troubleshooting problems more effectively.

Thus, generally, the novel embodiments disclosed herein can be used to supplement existing performance monitoring systems. For example, one common core performance monitoring technique can to turn on and off tracing that can monitor and trace core traffic for a specific software task. However, the common core technique is inadequate to tracing the bus operations associated with a given program because, in part, these bus operations pass through a shared storage subsystem. The novel embodiments disclosed herein overcome this disambiguation problem, allowing identification of particular thread transactions in the shared storage subsystem. The novel embodiments disclosed herein provide new status flags and tracking hardware that can be configured to accurately label storage operations associated with a given program.

These features provide significant technical advantages not available to existing core tracing mechanisms.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method for tracing thread bus transactions in a multiprocessor system, comprising:
    decoding, by a processor, a first thread instruction of a thread, the thread comprising an ordered series of thread instructions;
    in the event the first thread instruction is a set bus trace enable bit (BTEB) instruction, setting a bus trace enable bit corresponding to the thread;
    in the event the BTEB is set:
        determining whether the first thread instruction is a trace-eligible instruction; and
        in the event the first thread instruction is a trace-eligible instruction, and the BTEB is set, setting a snoop tag trace enable bit (STTEB);
    monitoring bus transactions, by a hardware trace monitor (HTM), wherein each bus transaction comprises a STTEB;
    in the event a monitored bus transaction comprises a set STTEB, storing the bus transaction as trace data;
    in the event a monitored bus transaction comprises a reset STTEB, not storing the bus transaction as trace data; and
    determining whether an interrupt is active and, in the event an interrupt is active, storing the BTEB state with a process state information.

2. The method of claim 1, wherein setting the BTEB comprises setting a bit of a special purpose register (SPR), wherein the HTM is configured to read the SPR.

3. The method of claim 1, wherein determining whether the first thread instruction is a trace-eligible instruction comprises reference to a list of instruction codes.

4. The method of claim 1, further comprising: in the event the first thread instruction is a clear BTEB instruction, clearing the BTEB corresponding to the thread.

5. The method of claim 1, wherein a trace-eligible instruction is one of: a cache communication with a main memory, a processor communication with an input/output adapter, a first cache communication with a second cache, and a synchronization operation.

6. The method of claim 1, wherein a direct memory access (DMA) instruction is not a trace-eligible instruction.

7. A system, comprising:
    a system bus;
    a first processor coupled to the system bus;
    a hardware trace monitor (HTM) coupled to the system bus;
    wherein the first processor is configured to receive and decode instructions, each instruction corresponding to an associated thread;
    wherein the first processor is further configured to, in the event a decoded instruction is a set bus trace enable bit (BTEB) instruction, set a BTEB corresponding to the thread associated with the decoded set BTEB instruction;
    wherein the first processor is further configured to initiate bus transactions on the system bus based on thread instructions, each bus transaction comprising a snoop tag trace enable bit (STTEB), and, in the event the BTEB is set, and in the event a bus transaction corresponds to a trace-eligible instruction, the first processor is further configured to set the STTEB;
    wherein the HTM is configured to monitor bus transactions;
    wherein the HTM is further configured to store the bus transaction as trace data in the event a monitored bus transaction comprises a set STTEB; and
    wherein the HTM is further configured not to store the bus transaction as trace data in the event a monitored bus transaction comprises a reset STTEB; and
    wherein setting the STTEB comprising broadcasting a tag in conjunction with the bus transaction.

8. The system of claim 7, further comprising a special purpose register (SPR) coupled to the system bus and configured to store a plurality of BTEBs, and wherein the HTM is configured to read the SPR.

9. The system of claim 7, wherein determining whether a thread instruction is a trace-eligible instruction comprises reference to a list of instruction codes.

10. The system of claim 7, wherein the first processor is further configured to, in the event the first thread instruction is a clear BTEB instruction, clear the BTEB corresponding to the thread.

11. The system of claim 7, wherein a trace-eligible instruction is one of:
    a cache communication with a main memory, a processor communication with an input/output adapter, a first cache communication with a second cache, and a synchronization operation.

12. The system of claim 7, further comprising:
    a cache coupled to the system bus and to the processor;
    a system memory coupled to the system bus; and
    wherein trace-eligible bus transactions comprise bus transactions transferring data between the cache and the system memory.

13. A computer program product for tracing thread bus transactions in a multiprocessor system, the computer program product stored on a non-transitory computer usable medium having computer usable program code embodied therewith, the computer useable program code comprising:
    computer usable program code configured to decode a first thread instruction of a thread, the thread comprising an ordered series of thread instructions;

computer usable program code configured to, in the event the first thread instruction is a set bus trace enable bit (BTEB) instruction, set a bus trace enable bit corresponding to the thread;

computer usable program code configured to, in the event the BTEB is set:

determine whether the first thread instruction is a trace-eligible instruction; and in the event the first thread instruction is a trace-eligible instruction, and the BTEB is set, set a snoop tag trace enable bit (STTEB);

computer usable program code configured to monitor bus transactions, by a hardware trace monitor (HTM), wherein each bus transaction comprises a STTEB;

computer usable program code configured to, in the event a monitored bus transaction comprises a set STTEB, store the bus transaction as trace data;

computer usable program code configured to, in the event a monitored bus transaction comprises a reset STTEB, not storing the bus transaction as trace data; and computer usable program code configured to determine whether an interrupt is active and, in the event an interrupt is active, to store the BTEB state with a process state information.

14. The computer program product of claim 13, wherein setting the BTEB comprises setting a bit of a special purpose register (SPR), wherein the HTM is configured to read the SPR.

15. The computer program product of claim 13, further comprising: computer usable program code configured to, in the event the first thread instruction is a clear BTEB instruction, clear the BTEB corresponding to the thread.

16. The computer program product of claim 13, wherein a trace-eligible instruction is one of: a cache communication with a main memory, a processor communication with an input/output adapter, a first cache communication with a second cache, and a synchronization operation.

17. The computer program product of claim 13, wherein a direct memory access (DMA) instruction is not a trace-eligible instruction.

\* \* \* \* \*